Oct. 11, 1966 P. C. ROUSE 3,277,932
SHAPING MACHINE
Filed Nov. 26, 1963 6 Sheets-Sheet 1

INVENTOR.
PAUL C. ROUSE
BY
Kimmel & Crowell
ATTORNEYS.

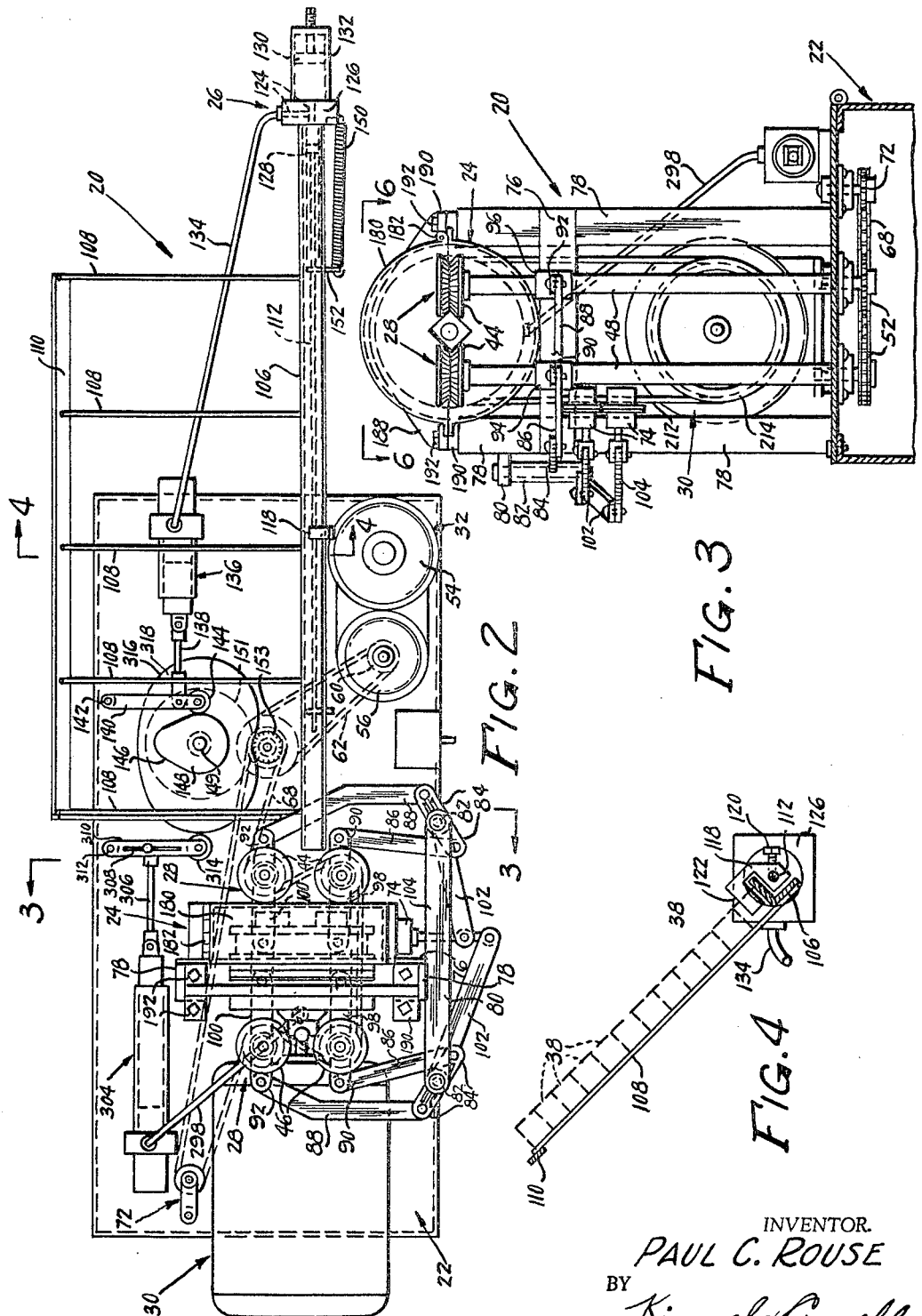

Oct. 11, 1966

P. C. ROUSE 3,277,932

SHAPING MACHINE

Filed Nov. 26, 1963

INVENTOR.
PAUL C. ROUSE
BY
Kimmel & Crowell
ATTORNEYS.

Oct. 11, 1966  P. C. ROUSE  3,277,932
SHAPING MACHINE
Filed Nov. 26, 1963  6 Sheets-Sheet 4

INVENTOR.
PAUL C. ROUSE
BY
Kimmel & Crowell
ATTORNEYS.

Oct. 11, 1966 P. C. ROUSE 3,277,932
SHAPING MACHINE
Filed Nov. 26, 1963 6 Sheets-Sheet 5

INVENTOR.
PAUL C. ROUSE
BY Kimmel & Crowell
ATTORNEYS.

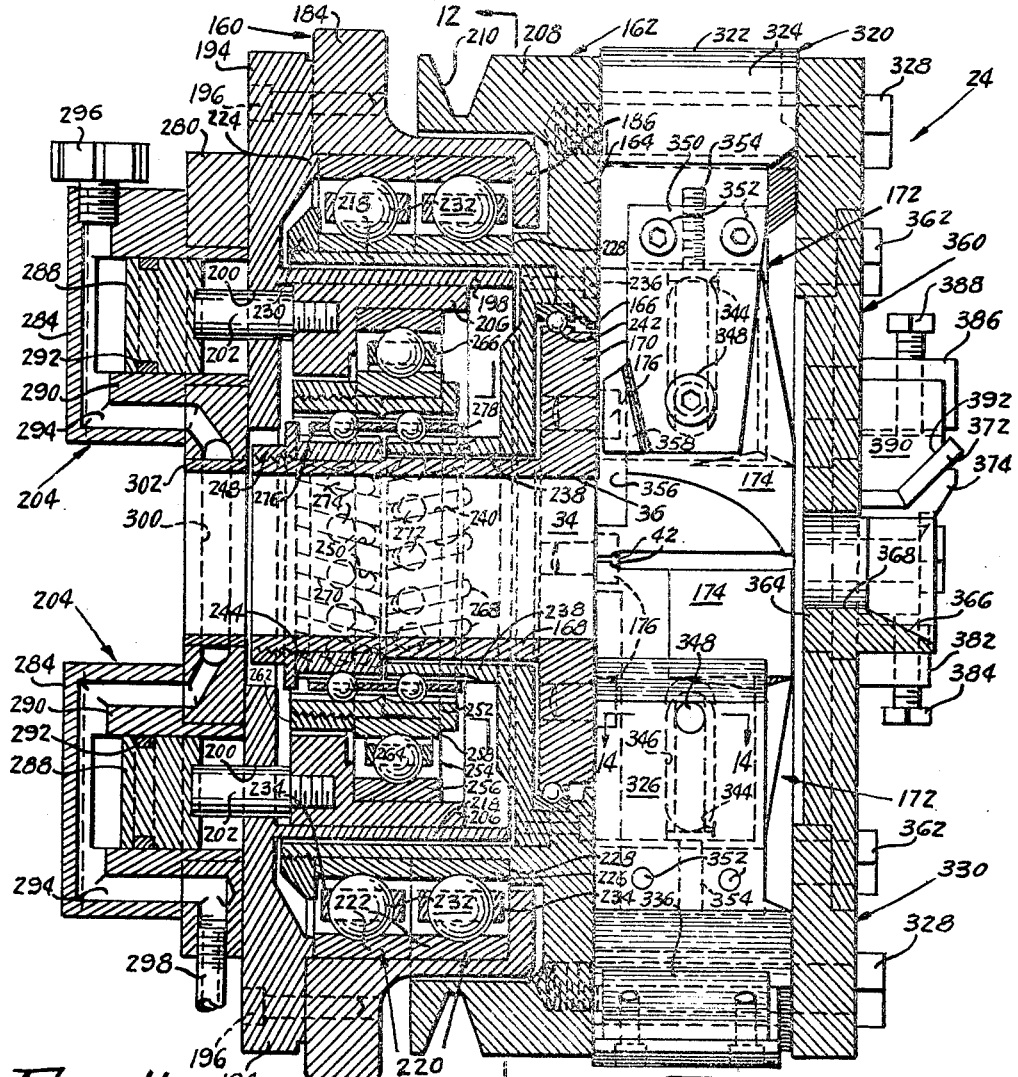
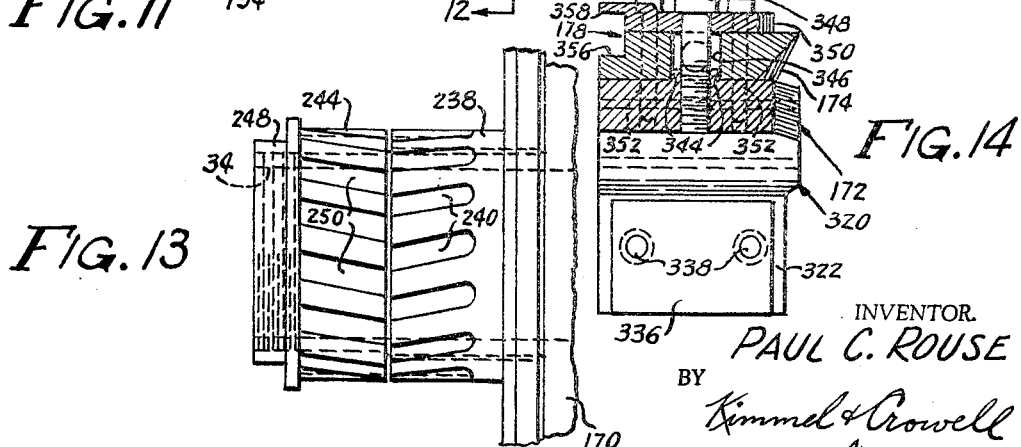
FIG. 11
FIG. 13
FIG. 14
INVENTOR.
PAUL C. ROUSE
BY
Kimmel & Crowell
ATTORNEYS.

United States Patent Office 3,277,932
Patented Oct. 11, 1966

3,277,932
SHAPING MACHINE
Paul C. Rouse, Rte. 3, Union City, Pa.
Filed Nov. 26, 1963, Ser. No. 325,915
18 Claims. (Cl. 142—28)

This application forms a continuation-in-part of my earlier application Serial No. 56,392 filed September 16, 1960 and entitled "Dowel Tapering Machine," now abandoned.

This invention relates to a shaping machine and more particularly to a machine for shaping and tapering a dowel or other similar elongated article.

A primary object of this invention is the provision of a machine which will simultaneously turn and taper a dowel or the like.

Another object of the instant invention is to provide a shaping machine which will automatically reduce the taper of a dowel or other object in accordance with the contour of a preselected shaping cam means.

A still further object of this invention is the provision of a device of the character described wherein the automatic shaping is effected without stopping or shutting down the machine.

Yet another object of the instant invention is to provide such a device wherein a dowel or other such object is fed into the machine automatically in accordance with a preselected cam arrangement.

Another object of the instant invention is the provision of a shaping machine which is particularly adapted for the turning of short objects, such as chair or table legs or the like.

Still another object of the invention is to provide a shaping machine having a relatively wide range of adaptability and wherein a taper may be effected, for example, of a head of 1⅜ inch to 1/16 inch, the above limits being illustrative, and adaptable to further extension upon minor modifications of the apparatus.

A further object of this invention is to provide a pivotally mounted shaping knife assembly for a dowel tapering machine wherein a knife member is adjustably mounted to vary the cutting relationship and is precluded from accidental angular displacement whereby the same article may repeatedly and accurately be produced by the machine.

A still further object of the instant invention is the provision of a dowel shaping and tapering machine having guide roller means arranged to facilitate and assist in accurate feeding of the work piece to the cutting head of the same.

Yet another object of the instant invention is to provide a machine of the character described having a magazine feed to allow for substantially continuous operation of the same.

A still further object of the invention is the provision of a device of the character described, which is sturdy and durable in construction, reliable and efficient in operation, and relatively simple and inexpensive to manufacture, utilize, and maintain.

Other and further objects reside in the combination of elements, arrangement of parts, and features of construction.

Still other objects will in part be obvious and in part be pointed out as the description of the invention proceeds and as shown on the accompanying drawings wherein:

FIGURE 2 is a top plan view thereof;

FIGURE 3 is a partial transverse cross-sectional view taken substantially on line 3—3 of FIGURE 2;

FIGURE 4 is a partial transverse cross-sectional view taken substantially on line 4—4 of FIGURE 2, showing the magazine feed and indicating a plurality of work pieces in dotted lines;

FIGURE 11 is an enlarged vertical cross-sectional view through the cutting head;

FIGURE 13 is a fragmentary side elevation view of a sub-assembly of the cutting head; and FIGURE 14 is a fragmentary cross-sectional view through one of the shaping knife assemblies taken substantially on line 14—14 of FIGURE 11.

Similar reference characters refer to similar parts throughout the several views of the drawings.

Figures 1, 5:
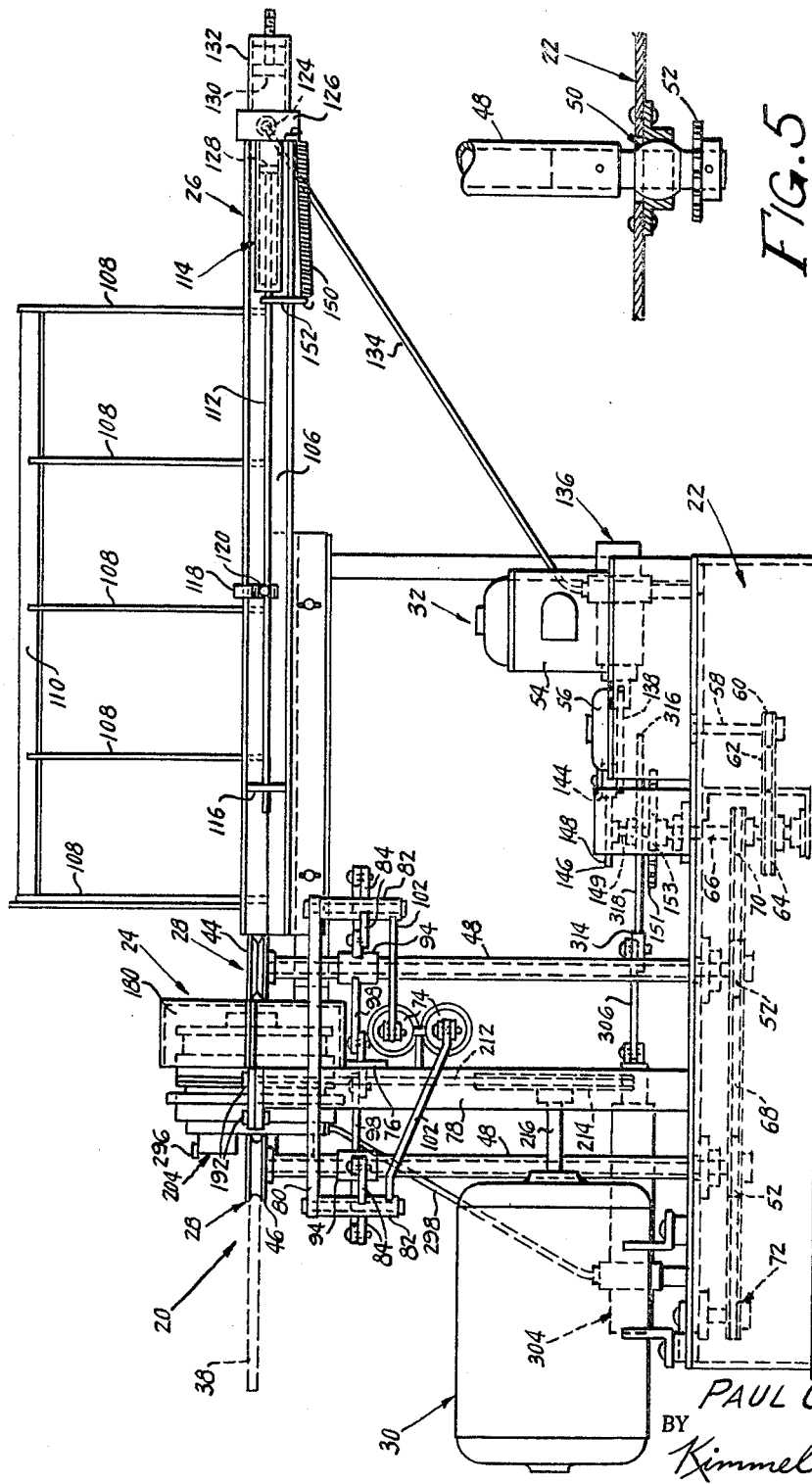
FIGURE 1 is a side elevational view of a preferred form of shaping machine in accordance with the instant inventive concept.
FIGURE 5 is an enlarged fragmentary detail view of the universal mounting for a standard means carrying one of the guide roller means assisting in feeding of the work pieces to the cutting head.
Figure 6:
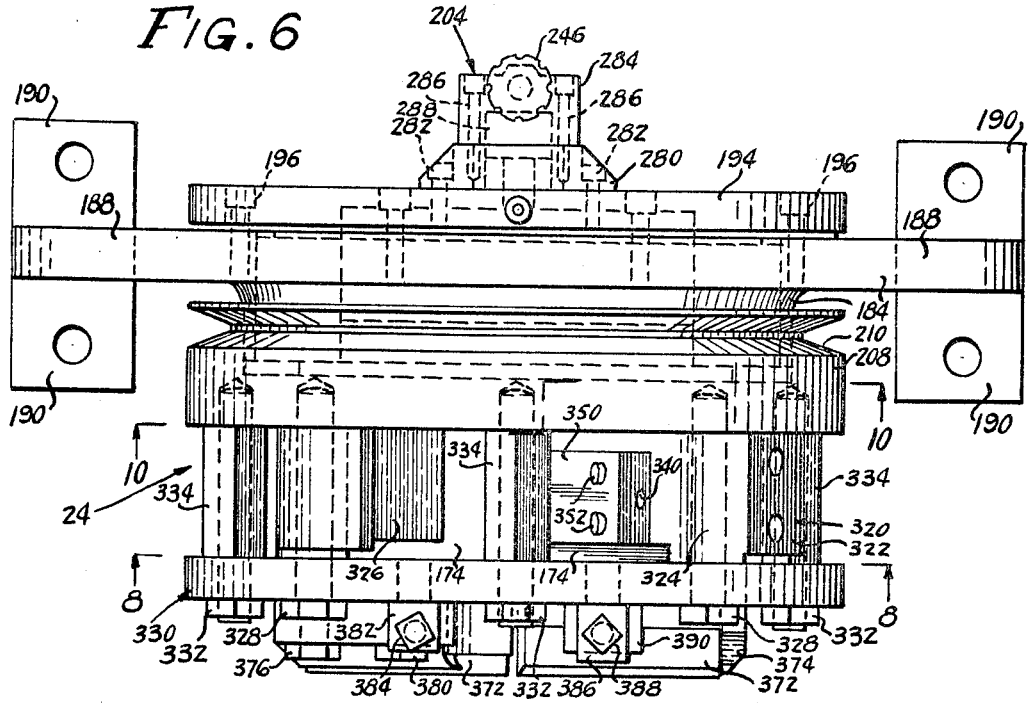
FIGURE 6 is an enlarged top plan view of the cutting head itself with its cover member removed.
Figure 7:
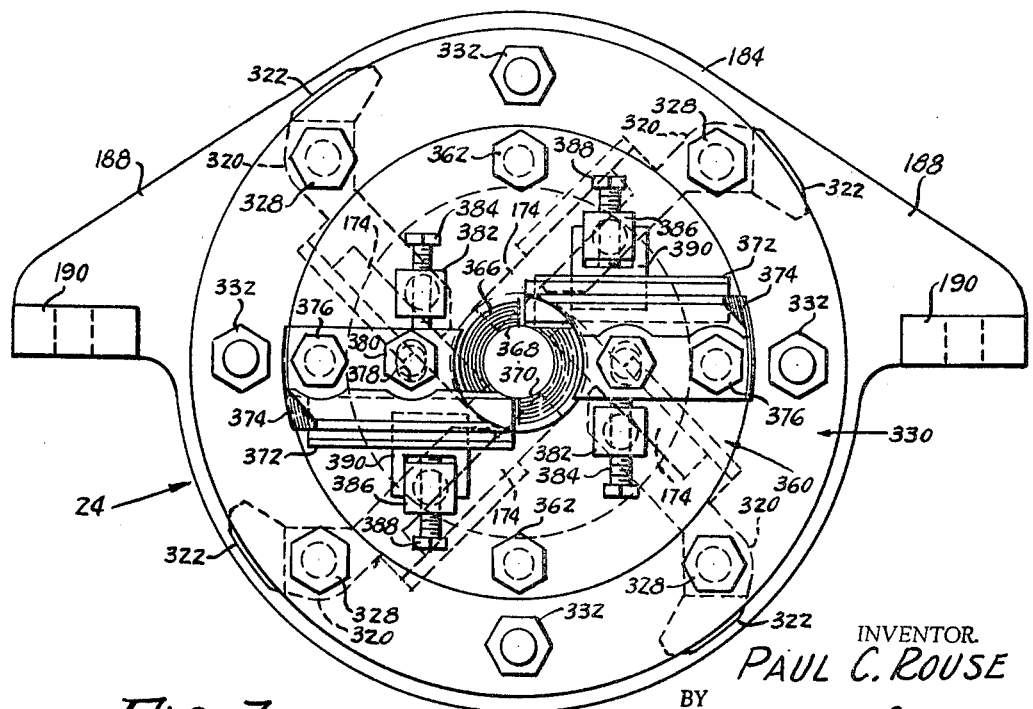
FIGURE 7 is a front view of the cutting head.
Figure 8:
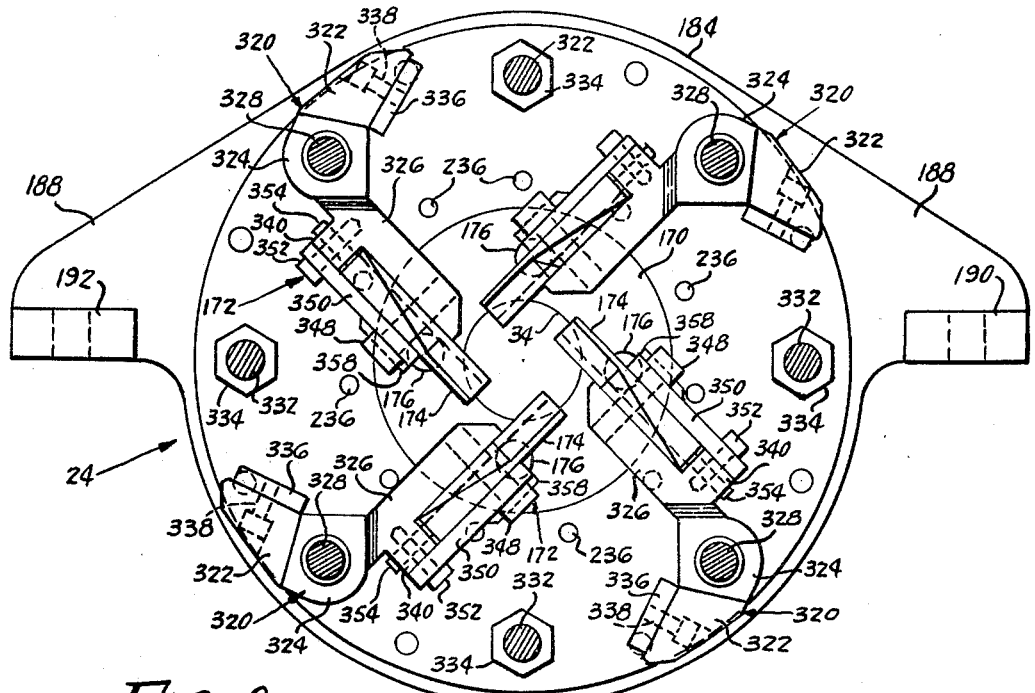
FIGURE 8 is a transverse cross-sectional view taken substantially on line 8—8 of FIGURE 6.
Figure 9:
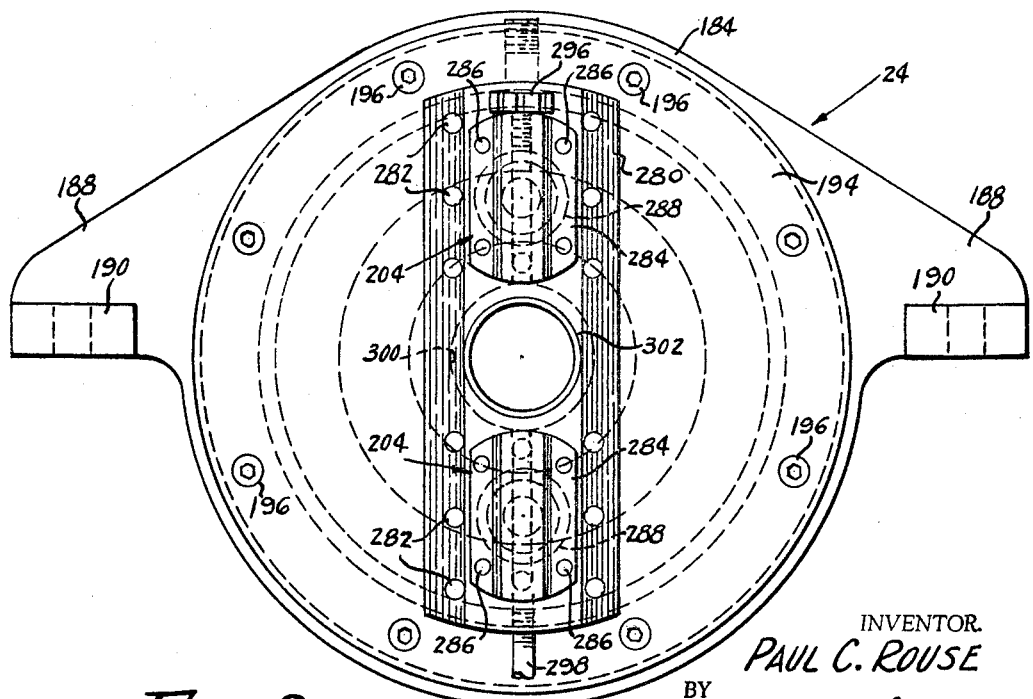
FIGURE 9 is a rear view of the cutting head.
Figure 12:
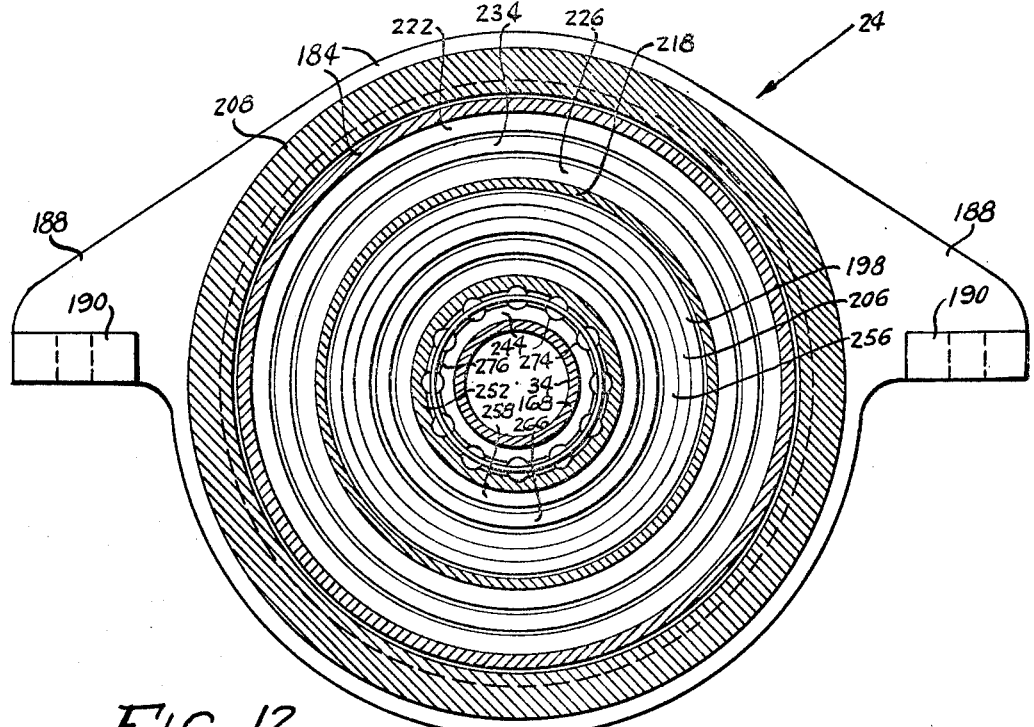
FIGURE 12 is a transverse cross-sectional view taken substantially on line 12—12 of FIGURE 11.
Figure 10:
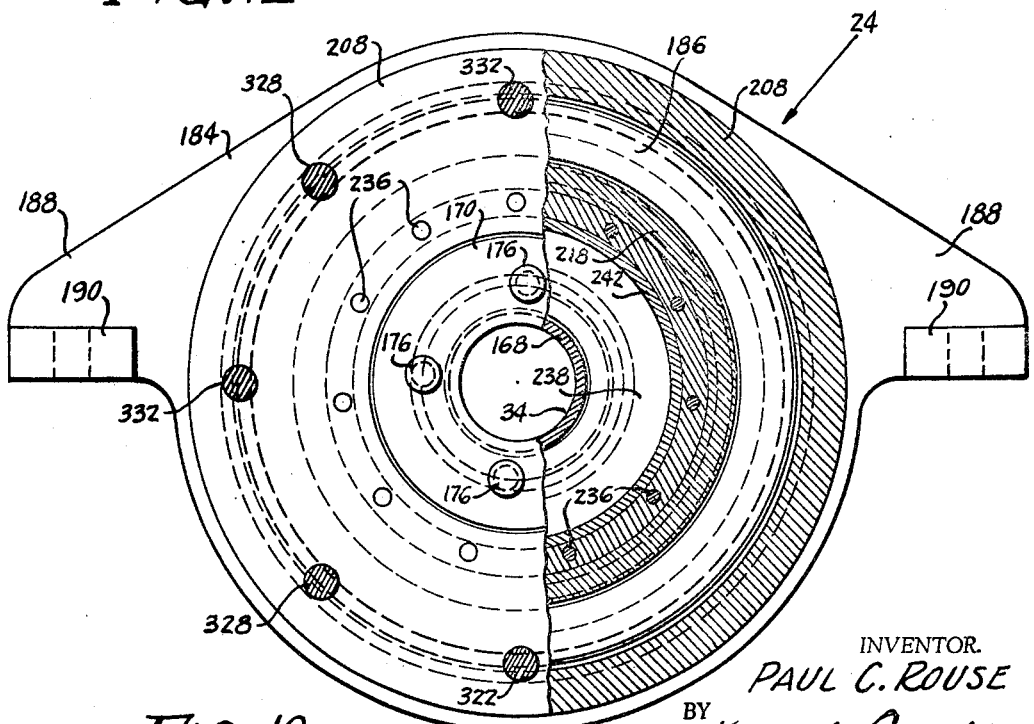
FIGURE 10 is a transverse cross-sectional view through the cutting head taken substantially on line 10—10 of FIGURE 6.

Referring now to the drawings in general and more particularly to FIGURES 1 to 5, a shaping machine in accordance with the instant inventive concept is designated generally by the reference numeral 20 and comprises basically a support means 22, a cutting head 24, dowel feeding means 26, guide roller means 28, head driving means 30, and guide, feeding, and shaping driving means 32.

The cutting head 24, to be described in more detail hereinafter, has a central opening 34 (note particularly FIG. 11) into the forward end 36 of which a dowel or similar elongated work piece 38 is fed by the dowel feeding means 26. A cutting means generally designated at 42 is operatively interposed in the path of the dowel 38 being fed to the opening 34 in the cutting head 24.

The guide roller means 28 includes a first pair of spaced guide rollers 44, aligned with the opening or bore 34, and positioned between the dowel feeding means 26 and the cutting means 42. The guide roller means 28 may further include a second pair of spaced guide rollers 46 positioned rearwardly of the bore 34 and aligned therewith, the first guide rollers 44 having substantially V-shaped notched faces to receive the angular corners of the unshaped work piece and the second pair of guide rollers 46 having concave grooved surfaces to receive the curved periphery of a finished work piece. Each of the guide rollers 44 and 46 are secured to the upper end of a substantially vertical standard means 48, the lower end of which is universally mounted by a ball and socket joint such as shown at 50 in FIGURE 5 in the support means 22. A sprocket 52 is secured below the universal mounting 50 and is operatively connected to the driving means 32 to provide rotation to the guide roller means 28 thereby facilitating the feeding of the dowel 38 and simultaneously aligning the same with the bore 34. The driving means 32 includes a conventional motor 54 connected in any conventional manner to a gear reduction means 56 having a drive shaft 58 carrying a sprocket 60 driving a chain 62 which passes over an enlarged sprocket 64 secured to a rotatably supported shaft 66. A chain means 68 is driven by an additional sprocket 70 secured to the shaft 66 and passes over each of the sprockets 52 and over a spring pressed idler sprocket 72 to continuously rotate each of the guide rollers 44 and 46. The chain 68 is so arranged with respect to the sprockets 52 as to drive the rollers of each pair in opposite directions so as to feed a dowel 38 from the forward end 36 of the bore 34 to the rearward end of the same. Note particularly FIGURE 2.

Biasing means comprising a pair of air cylinders 74 or the like and linkage elements operatively interconnecting the same with each of the standard means 48 are provided to normally urge each roller of the first and second pairs of guide rollers 44 and 46, respectively, toward each other to maintain the same in contact with a dowel 38 fed therebetween. It will be obvious to one with ordinary skill in the art that the air cylinders 74 may readily be replaced by spring means or other such conventional expedients. The operation of the biasing means on the first and second pairs of guide rollers is substantially the same, one of the air cylinders normally urging the rollers of the first pair 44 toward each other, and the other air cylinder normally urging the rollers of the second pair 46 toward each other. A cross head 76 is secured to vertical support columns 78, one of which carries a fixed arm 80, the opposite ends of which carry rotatable sleeve members 82 to which are fixed oppositely disposed, outstanding ears 84. The ears 84 are pivotally secured at their ends to link elements 86 and 88, the opposite ends of which are pivotally secured to lugs 90 and 92, respectively, carried by collars 94 and 96 rotatably secured to the standard means 48 of each pair of guide rollers, the collars 94 and 96 having additional lugs 98 and 100, respectively, pivotally secured to the cross head 76. The sleeves 82 also have fixed thereto for rotation thereof one end of links 102, the opposite end of each link 102 being pivotally connected to piston rods 104 of air cylinders 74.

The air cylinders 74 are designed to normally urge their piston rods 104 inwardly causing rotation of the sleeves 82 through the links 102. As the sleeves 82 are rotated, the ears 84 turn in opposite directions pushing one of the links 86, 88, and pulling the other. The lugs 90 and 92 acting through the collars 94 and 96 and the additional lugs 98 and 100 twist the standard means 48 about their universal mountings 50 normally urging the guide rollers supported thereby toward each other while allowing for outward movement to accommodate larger dowels or work pieces 38. The sprockets 52 are moved only slightly in response to this tilting of the standard means 48 in view of the relatively short distance below the support means 22 as compared to the elongated dimensions of the standard means 48. Thus, the chain 68 is not disengaged from the sprocket 52 so that the guide rollers 44 and 46 may continuously be rotated even as they move inwardly and outwardly with respect to the dowel under the influence of the biasing means.

The dowel feeding means 26 includes an elongated angle iron 106 to which is secured a plurality of inclined support elements 108 connected adjacent their opposite ends by a cross bar 110 and defining a tray means for slidingly supporting a plurality of unshaped dowels 38 as shown particularly in FIGURE 4. The juncture of the angle iron support member 106 and the tray means defines a trough aligned with the bore 34 in the cutting head 24, the lowermost dowel 38 riding in this trough. An elongated piston rod 112 of a feed hydraulic cylinder 114 is slidingly received through a bore in a support member 116 carried by the angle iron support member 106. A feeding member 118 is adjustably secured to the piston rod 112 by a screw means 120 and includes a feeding finger 122 extending over the angle iron support member 106 into the aforementioned trough to engage the rearward end of one of the dowels 38. Note particularly FIGURE 4. The feeding finger 122 is reciprocated in the trough by hydraulic pressure received through passageways 124 in a block 126 behind the piston 128 fixed to the piston rod 112 in the feed hydraulic cylinder 114. The volume of the cylinder 114 may be varied by an adjustable piston means 130 slidably received in an auxiliary cylinder 132 communicating with the passageways 124. A flexible conduit means 134 operatively connects the feed hydraulic cylinder 114 with a master feed hydraulic cylinder 136, the piston rod 138 of which is pivotally secured intermediate the ends of an arm 140, one end of which is pivotally secured at 142 to the support means 22 and the other end of which rotatably carries a cam follower 144 ridingly engaging a feed cam surface 146 of a feed cam means 148 fixed for rotation with a shaft 149 having a gear 151 intermeshing with a gear 153 secured to the shaft 66 operatively connected to the driving means 32. Spring means 150 are secured between an element 152 fixed to the piston rod 112 of the feed hydraulic cylinder 114 and the block 126 to retract the piston rod 112 and the feeding finger 122 therewith when the hydraulic pressure is reduced by engagement of the cam follower 144 with a low dwell portion of the feed cam surface 146. Thus, the feeding of the dowel is controlled by the contour of the feed cam surface 146 whereby the feeding finger 122 pushes one dowel 38 from the trough defined by the tray means and the upper surface of the angle iron support member 106 into the bore 34 of the cutting head 24 on its forward movement, the spring means 150 withdrawing the same to permit another dowel from the tray means to slide into the trough for subsequent feeding.

Referring now particularly to FIGURES 6 to 13, the cutting head 24 is comprised basically of a first assembly designated generally by the reference numeral 160 and nonrotatably secured to the support columns 78 of the support means 22, a second assembly designated generally by the reference numeral 162 and rotatably mounted with respect to the first assembly, the second assembly 162 including a face plate 164 having portions defining a central opening 166 therethrough, and a central sleeve 168 defining the central bore 34 therethrough and including an annular flange 170 surrounding the forward end 36 of the bore 34 and rotatably mounted within the opening 166 in the face plate 164. At least one radially extending shaping knife assembly designated generally by the reference numeral 172, four such assemblies extending at substantially right angles being shown as illustrative, is pivotally mounted on the face plate 164 and has a knife member 174 including the cutting means portion 42 which extends in cutting relationship in the path of dowel 38 being fed to the bore 34 of the sleeve 168. Connecting means including lug members 176 are secured to the flange 170 of the central sleeve 168 and are received within pockets 178 (note particularly FIG. 14) defined by portions of each knife assembly 172 at a point remote from its pivotal mounting. Means to be described in more detail hereinafter are provided for rotating the flange 170 of the central sleeve 168 within the opening 166 of the face plate 164 while the cutting head 24 is rotating to vary the cutting relationship of the cutting means portion 42 of the knife member 174 and hence to vary the diameter to which the dowel 38 is reduced without stoppage of the machine 20.

A cover member 180 shown in FIGURES 1 to 3 and broken away in FIGURES 6 to 13 is hingedly supported at 182 and extends over the forward components of the cutting head 24 to protect the same during operation.

The first assembly 160 includes a fixed member 184 having an inwardly extending flange 186 and two outwardly extending ear portions 188 with lug members 190 secured by bolts or the like 192 to the support columns 78. A back plate 194 is fixedly secured by a plurality of bolts or the like 196 to the fixed member 184 and includes an annular flange portion 198 extending forwardly toward the face plate 164 of the second assembly 162. The back plate 194 includes apertures 200 for slidingly receiving piston rods 202 of hydraulic cylinders 204, the piston rods being secured interiorly of the back plate 194 to an axially movable element 206 slidable within the annular flange 198.

The second assembly 162 includes a pulley member 208 having a V-shaped notch 210 frictionally receiving a driving belt 212 which passes over a pulley 214 fixed to the drive shaft 216 of the head driving means 30. Note particularly FIG. 3. The forward portion of the pulley 208 defines the face plate 164 having the opening 166 and the pulley member 208 includes a rearwardly extending annular flange 218, a pair of ball bearing assemblies 220 being operatively interposed between the fixed member 184 and the annular flange 218 to allow relative rotation between the first and second assemblies 160 and 162, respectively. These ball bearing assemblies 220 include outer races 222 secured to the first assembly 160 between the flange 186 of the fixed member 184 and a boss 224 of the back plate 194, inner races 226 secured to the second assembly 162 between a shoulder 228 on the pulley member 208 and a locking sleeve 230 threadably received over the rearwardly extending annular flange 218 of the pulley member 208, and a plurality of ball members 232 circumferentially spaced between the inner and outer races 226, 222, respectively, by apertured spacer elements 234. A ball bearing assembly 242 is interposed between the flange 170 of the central sleeve 168 and the second assembly 162 to allow relative rotation between these portions of the machine 20.

Fixed to the pulley member 208 for rotation therewith by a plurality of bolts 236 is a first inner race member 238 having a rearwardly extending flanged portion defining a group of circumferentially spaced helical grooves 240. A second inner race member 244 is secured to the central sleeve 168 between a shoulder 246 and a locking ring 248 threadably received on the rearward end of the central sleeve 168 and defines a second group of circumferentially spaced helical grooves 250 angularly disposed in an opposite direction to the grooves 240. Note particularly FIGURES 11 and 13.

An annular outer race member 252 is secured to the movable element 206 for axial movement therewith and is rotatable with respect thereto, a ball bearing assembly 254 being interposed therebetween with its outer race 256 secured to the axially movable element 206 and its inner race 258 held between a flange 260 on the outer race member 252 and a locking ring 262 threadably received over the rearward end of the same, a plurality of balls 264 being carried between the outer and inner races 256, 258, respectively of the ball bearing assembly 254 by an apertured spacer 266. The interior portions of the outer race member 252 define oppositely extending groups of circumferentially spaced helical grooves 268 and 270 helically parallel, and extending in opposed relation, to the groups of helical grooves 240 and 250, respectively, on the first and second inner race member 238 and 244. A plurality of balls 272 and 274 are carried by spacer elements 276 and 278 between each pair of groups of opposed parallel helical grooves 240, 268 and 250, 270, respectively.

It will now be seen that actuation of the reciprocating means defined by the hydraulic cylinders 204 will cause relative rotation of the flange 170 of the central sleeve 168 in the opening 166 of the face plate 164. As the piston rods 202 reciprocate, they move element 206 axially either forwardly or rearwardly which in turn axially displaces the outer race member 252. The balls 272 and 274 will ride in opposite directions in their respective helical grooves causing relative rotation between the first inner race member 238 forming part of the second assembly 162, and the second inner race member 244 forming part of the central sleeve 168. This can occur while the second assembly 162 is being rotated by the head driving means 30 as explained hereinabove. Relative rotation of the flange 170 of the central sleeve 168 within the opening 166 of the face plate 164 circumferentially displaces the lug members 176 secured to the flange 170 varying the cutting relationship of the cutting portion 42 of the knife assemblies 172 as will be explained in more detail hereinafter.

A mounting plate 280 is secured to the back plate 194 by a plurality of bolt means 282 or the like and cylinder blocks 284 for each hydraulic piston 204 are secured to the mounting plate 280 by bolt means 286 or the like. The piston rods 202 are carried by pistons 288 reciprocable within cylinders 290 interiorly of each cylinder block 284, O-rings or the like 292 being provided to seal the pistons 288 within the cylinders 290. A continuous passageway 294 is defined within each cylinder block 284 in communication with the rear head of each piston 288, one end of the passageway 294 being sealed by a plug 296 and the other end communicating with a flexible conduit 298. An annular groove 300 sealed by a press fit sleeve 302 provides communication between the passageways 294 in the two hydraulic cylinders 204. The flexible conduit 298 is operatively connected to a master shaping hydraulic cylinder 304 (note particularly FIGURES 1 to 3) having a piston rod 306 pivotally and adjustably secured in an elongated groove 308 of an arm 310. The arm 310 is pivotally secured at one end 312 to the support means 22 and rotatably carries a cam follower 314 at its opposite end which ridingly engages a shaping cam surface 316 on shaping cam means 318 mounted for rotation on the shaft 149 which carries the feeding cam means 148. Thus, the reciprocation of the shaping hydraulic cylinders 204 and in turn the variation in the cutting relationship of the cutting portions 42 of the shaping knife assemblies 172 is controlled by the contour of the shaping cam surfaces 316. Adjustment of the mounting of the piston rod 306 within the slot 308 of the arm 310 will increase or decrease the variation in diameter of the finished dowel.

Any conventional means may be provided to allow for readily removing the feed cam means 148 and the shaping cam means 318 and replacing the same with cam means of a different configuration.

Each of the shaping knife assemblies 172 includes a base member 320 having a counter weight portion 322, a hub portion 324, and a knife support portion 326. The hub portions 324 have an aperture defined therethrough which receives bolt members 328 threadably secured in the face plate 164 of the pulley member 208 and pivotally mounting the knife assemblies 172 between the pulley member 208 and a front plate 330. Additional bolts 332 are peripherally spaced between the bolts 328 and support spacer sleeves 334 to maintain the front plate 330 away from the pulley member 208 a distance sufficient to allow free pivotal movement of the knife assemblies 172. Note particularly FIGURE 6. Weight members 336 are selectively secured to the counter weight portions 322 by bolt means 338 or the like. The counter weight portion 322 and the knife support portion 326 of the base member 320 define an angle of between about 90° and 270° with the hub portion 324 defining the vertex of the angle. The knife support portion 326 has a flange member 340 and includes a longitudinal key element 342 which is slidingly received in a keyway 344 extending the full length of the knife member 174 to allow for longitudinal adjustability of the cutting portion 42 of the knife member 174 while precluding angular displacement of the knife member 174 with respect to the base member 320. An elongated slot 346 having its ends closed is also defined through the knife member 174. A bolt means 348 is received through an aperture in a cover member 350 and is threadably secured in the knife support portion 326 of the base member 320 passing through the elongated slot 346 of the knife member 174. Additional bolt means 352 secure the cover member 350 to the flange 340 on the knife support portion 326, the bolt means 348 acting as a lock down. Adjustment of the knife member 174 is facilitated by an adjusting member 354 threadably received through the flange 340 and engaging the knife member 174 at a point remote from the cutting portion 42 to selectively slide the keyway 344 of the knife member 174 on the key element 342 of the base member 320, the bolt means 348 securing the knife member 174 in adjusted relation. An elongated groove 356 in the knife member 174 and an ear member 358 on the cover plate 350 define the pockets 178 of each knife assembly 172 which receive the connecting means 176 for adjustment of a cutting relationship.

As the pulley 208 of the second assembly 162 is rotated by the head driving means 30, the knife assemblies 172 extending in substantially radial relationship rotate about the bore 34, centrifugal force on the knife support portions 326 maintaining the knife in a particular cutting relationship with respect to a work piece 38 being fed into the bore 34 of the central sleeve 168. Relative rotation of the sleeve 168 within the opening 166 of the face plate 164 of the second assembly 162 adjusts the position of cutting portion means 42 of the knife assemblies 172 thereby varying the configuration of the finished dowel in response to the variation in contour of the shaping cam surface 316. Weight members 336 may be added to the counterweight portions 322 to correct the change in balance of the knife assemblies 172 caused by grinding of the knife members 174 during sharpening of the same.

A rough cutting means may be provided for removing the corners from a dowel 38 which is substantially square in initial cross-section before the dowel is shaped by the knife assemblies 172. The rough cutting means is secured to the second assembly for rotation therewith and includes a plate 360 fixed by bolt means 362 to the front plate 330 and carrying in press fit relation centrally thereof a rough cutting head 364 having a substantially conical feed end 366 communicating with a central bore 368 aligned with the bore 34 in the central sleeve 168. As seen particularly in FIGS. 7 and 11, the conical feed end 366 of the rough cutting head 364 has substantially diametrically opposed V-shaped notches 370 receiving the cutting portion of a rough cutting knife member 372, angular in form and supported by a rough cutting knife support members 374. The rough cutting knife support members 374 are pivotally secured to the plate 360 by bolt means 376 and have arcuate slots 378 adjustably receiving bolt means 380 to allow for slight variation in positioning of the same. Block members 382 are fixed to the plate 360 and threadably carry adjusting bolt means 384 which bear against the rough cutting knife support members 374. Additional block members 386 are similarly fixed to plate 360 and threadably carry bolt means 388 which bear against U-shaped backing members 390 having angular faces 392 corresponding to the shape of the rough cutting knife members 372. Thus, radial adjustment of the rough cutting knife members 372 may be effected by sliding movement of the same with respect to the rough cutting knife support member 374, and pivotal movement of the same may be effected by relative adjustment of the bolt means 384 and 388.

The use and operation of the dowel shaping machine 20 of the instant invention will now be apparent. A plurality of dowels 38 are stacked on the tray means of the magazine and are fed consecutively by the feeding finger 122 of the feed means 26 in accordance with the contour of the feed cam means surface 146. The first guide rollers 44 are biased into engagement with opposite sides of the dowel 38 by the operation of the biasing means formed by the air cylinders 74 and the linkage means connected to the standard means 48 causing pivotal movement about the universal mounting at 50 in the support means 22. Simultaneously the driving means 32 causes rotation of the first guide rollers 44 by the action of the chain 68 on the sprocket 52. As the dowel 38 is fed to the rough cutting means the corners of the dowel are removed by the rough cutting knife members 372. Further feeding of the dowel 38 into the bore 34 of the central sleeve 168 causes shaping of the same by the cutting portions 42 of the knife assemblies 172, variation in the configuration of the finished dowel being provided by relative rotation of the central sleeve 168 within the opening 166 in response to axial movement of the piston rods 202 of the shaping hydraulic cylinders 204 in accordance with the contour of the shaping cam surface 316, the oppositely disposed groups of helical grooves 240, 268 and 250, 270 acting on the balls 272, 274 to rotate the central sleeve 168 while the second assembly 162 carrying the shaping knife assemblies 172 is rotated at a relatively high speed by the head driving means 30. As the finished dowel leaves the rearward end of the bore 34 in the central sleeve 168, it is grasped by the second pair of guide rollers 46 which are biased toward each other and rotated in a manner similar to the first pair of guide rollers 44.

It will be understood that although both the work piece and the finished product have been referred to as "dowel" throughout this specification, the shaping machine of the instant invention can be readily accommodated to work pieces of round, square or other cross-section and the finished product can vary in configuration in accordance with the particular shaping cam means 318 utilized.

It will now be seen that there is herein provided an improved dowel shaping machine which satisfies all of the objectives of the instant invention and others, including many advantages of great practical utility and commercial importance.

As many embodiments may be made of the instant inventive concept, and as many modifications may be made of the embodiments hereinbefore shown and described, it is to be understood that all matter herein is to be interpreted merely as illustrative, and not in a limiting sense.

I claim:
1. A dowel shaping machine comprising, in combination, a support means, a cutting head including a first assembly nonrotatably secured to said support means, a second assembly rotatably mounted with respect to said first assembly and including a face place having portions defining a central opening therethrough, and a central sleeve having portions defining a central bore therethrough with a forward end and a rearward end, said central sleeve including an annular flange surrounding said forward end of said bore and rotatably mounted within said opening in said face plate, head driving means rotating said second assembly, dowel feeding means aligned with said bore and feeding a dowel to said forward end thereof, at least one radially extending shaping knife assembly pivotally mounted on said face plate and including a knife member having a cutting portion extending in cutting relationship in the path of the dowel being fed to said bore, a connecting means secured to said flange of said central sleeve and engaging each knife assembly at a point remote from its pivotal mounting, and means rotating said flange in said opening while said cutting head is rotating to vary the cutting relationship of said cutting portion of said knife member and hence to vary the diameter to which the dowel is reduced without stoppage of the machine.

2. A structure in accordance with claim 1 further comprising, in combination, guide roller means carried by said support means, said giude roller means including a first pair of spaced guide rollers aligned with said bore and positioned between said feeding means and said cutting portion of said shaping knife assembly, guide driving means operatively connected to said first pair of guide rollers for rotating the same to assist in feeding the dowel, and biasing means normally urging said first pair of guide rollers toward each other to maintain the same in contact with a dowel fed therebetween.

3. A structure in accordance with claim 2 wherein each of said first pair of guide rollers is secured to the upper end of a substantially vertical standard means for rotation therewith, each of said standard means having a lower end universally carried by said support means and rotatable with respect thereto, said guide driving means being operatively connected to each of said standard means for rotating the same, and said biasing means causing pivotal movement of said standard means with respect to said support means about the universal mounting.

4. A structure in accordance with claim 3 further comprising, in combination, a second pair of spaced guide rollers aligned with, and positioned rearwardly of, said bore, said guide driving means being operatively connected to said second pair of guide rollers for rotating the same, and said biasing means being operatively connected to said second pair of guide rollers for normally urging said second pair of guide rollers toward each other.

5. A structure in accordance with claim 1 wherein said dowel feeding means includes a feed hydraulic cylinder having a piston rod, a rotating feed cam means having a feed cam surface, and operative connecting means between said feed hydraulic cylinder and said feed cam surface whereby the feeding of a dowel is controlled by the contour of said feed cam surface.

6. A structure in accordance with claim 5 further comprising, in combination, a magazine including an inclined tray means for slidingly supporting a plurality of unshaped dowels and a support member projecting from said tray means, the juncture of said tray means and said support member defining a trough aligned with said bore in said sleeve, a feeding finger secured to said piston rod of said feed hydraulic cylinder and reciprocating in said trough, said feeding finger pushing one dowel from said trough into said bore on its forward movement and withdrawing to permit another dowel from said tray means to slide into said trough for subsequent feeding.

7. A structure in accordance with claim 1 further including, in combination, a rough cutting means fixed to said second assembly for rotation therewith, said rough cutting means including at least one rough cutting blade member having a cutting portion extending in cutting relationship in the path of the dowel being fed to said bore in said central sleeve forwardly of said shaping knife assembly, said rough cutting means being adapted to remove the corners from a dowel which is substantially square in cross-section before the dowel is shaped by said knife assembly.

8. A structure in accordance with claim 1 wherein a plurality of radially extending shaping knife assemblies are pivotally mounted in circumferentially spaced relationship on said face plate, connecting means including lug members secured to said flange of said central sleeve and received within pockets defined by portions of each knife assembly at a point remote from its pivotal mounting whereby rotation of said flange with respect to said opening varies the shaping of the dowel.

9. A structure in accordance with claim 8 further comprising, in combination, a rotating shaping cam means having a shaping cam surface, and operative connecting means between said means for rotating said flange of said sleeve in said opening and said shaping cam surface whereby the shaping of the dowel is controlled by the contour of said shaping cam surface.

10. A structure in accordance with claim 9 wherein said last-mentioned operative connecting means comprises said first assembly including an axially movable element, reciprocating means moving said element in response to the contour of said shaping cam surface, an annular outer race member secured to said element for axial movement therewith and rotatable with respect thereto, interior portions of said outer race member defining oppositely extending groups of circumferentially spaced helical grooves, said second assembly including a first inner race member having exterior portions defining a group of circumferentially spaced helical grooves helically parallel, and positioned in opposed relation, to one of said groups of helical grooves on said outer race member, said central sleeve including a second inner race member having exterior portions defining a group of circumferentially spaced helical grooves helically parallel, and positioned in opposed relation, to the other of said groups of helical grooves on said outer race member, and ball means disposed between said opposed parallel helical grooves, whereby reciprocation of said axially movable element moves said outer race member, and said ball means causes relative rotation of said first and second inner race members causing said flange on said central sleeve to be rotated with respect to said opening in said face plate.

11. A structure in accordance with claim 10 wherein said reciprocating means includes at least one shaping hydraulic cylinder having a piston rod secured to said axially movable element.

12. A structure in accordance with claim 1 wherein each of said shaping knife assemblies includes a base member having a counter weight portion, a knife support portion, and a hub portion, said hub portion defining the pivotal mounting, said counter weight portion having weight members selectively secured thereto, and said knife support portion having said knife member secured thereto, said counter weight portion and said knife support portion defining an angle with said hub portion defining the vertex of the angle.

13. A structure in accordance with claim 12 wherein said knife support portion of said base member includes a longitudinal key element, and said knife member includes portions defining a keyway extending longitudinally thereof and slidingly receiving said key element, whereby angular displacement of said knife member and said base member is precluded.

14. In a shaping machine including cutting means rotatable with a first portion of the machine and having at least one knife member with a cutting portion extending in cutting relationship in the path of a work piece to be shaped by the machine, the improvement which comprises a shaping knife assembly including a base member having a counter weight portion, a knife support portion, and a hub portion, said hub portion being pivotally mounted on the first portion of the machine, said counter weight portion having weights selectively secured thereto, said knife support portion having said knife member secured thereto, said counter weight portion and said knife support portion defining an angle with said hub portion defining the vertex thereof, portions of said shaping knife assembly defining a pocket at a point remote from the pivotal mounting, connection means received in said pocket and fixed to a second portion of the machine, and means for rotating the second portion of the machine with respect to the first portion to vary the cutting portion relative to the path of the work piece while the first portion is rotating.

15. A structure in accordance with claim 14 wherein said angle is between 90 and 270°.

16. A structure in accordance with claim 14 wherein said knife support portion of said base member includes a longitudinal key element, and said knife member includes portions defining a keyway extending longitudinally of the same and slidingly receiving said key element, whereby angular displacement of said knife member and said base member is precluded.

17. A structure in accordance with claim 16 wherein said knife member further includes portions defining an elongated slot therethrough, a cover member securing said knife member to said knife support portion of said base member, a bolt means passing through said cover member, threadably secured in said base member, and slidingly received in said slot of said knife member, said bolt means clampingly securing said knife member between said base member and said cover member.

18. A structure in accordance with claim 17 further including an adjusting member engaging said knife member at a point remote from said cutting portion, said adjusting member selectively sliding said keyway of said knife member on said key element of said base member to vary the cutting relationship, and said bolt means fixedly securing said knife member in adjusted relation.

References Cited by the Examiner
UNITED STATES PATENTS

| | | | |
|---|---|---|---|
| 293,829 | 2/1884 | Westcott | 142—29 |
| 481,875 | 8/1892 | Snyder | 142—31 |
| 1,111,795 | 9/1914 | Hawker | 142—30 |

DONALD R. SCHRAN, *Primary Examiner.*